US006243961B1

(12) United States Patent
Winski

(10) Patent No.: US 6,243,961 B1
(45) Date of Patent: Jun. 12, 2001

(54) DECK TOOL

(76) Inventor: Paul N. Winski, 1810 S. Fork Ave., Amarillo, TX (US) 79118

( * ) Notice: Subject to any disclaimer, the term of this patent is extended or adjusted under 35 U.S.C. 154(b) by 0 days.

(21) Appl. No.: 09/375,025

(22) Filed: Aug. 16, 1999

(51) Int. Cl.[7] .......... G01B 1/00
(52) U.S. Cl. .......... 33/526; 33/474
(58) Field of Search .......... 33/474, 481, 526, 33/527, 613, 482, 562

(56) References Cited

U.S. PATENT DOCUMENTS

| | | | | |
|---|---|---|---|---|
| 2,911,022 | * | 11/1959 | Brown | 33/613 |
| 4,766,782 | | 8/1988 | Tanner . | |
| 4,773,163 | * | 9/1988 | Wolford, Jr. | 33/474 |
| 4,850,114 | | 7/1989 | Vockins | 33/613 |
| 4,930,225 | | 6/1990 | Phillips | 33/526 |
| 4,955,142 | | 9/1990 | Reick | 33/526 |
| 5,142,787 | * | 9/1992 | Dadisman | 33/474 |
| 5,170,568 | | 12/1992 | Wright | 33/474 |
| 5,560,117 | | 10/1996 | Tallman | 33/526 |
| 5,575,074 | | 11/1996 | Cottongim et al. | 33/474 |
| 5,666,737 | * | 9/1997 | Ryan, III | 33/562 |
| 5,727,325 | * | 3/1998 | Mussell | 33/481 |
| 5,933,974 | * | 8/1999 | Walters et al. | 33/474 |
| 6,018,880 | * | 2/2000 | Wiggins | 33/474 |

* cited by examiner

*Primary Examiner*—G. Bradley Bennett
(74) *Attorney, Agent, or Firm*—Randal D. Homburg

(57) ABSTRACT

This invention is a one-piece formed tool designed for use in deck construction, incorporating a square, a hard 45 degree angle, angled edges of 1/8 inch and 3/16 inch, a hanging hole for attachment of a string for use of the tool as a plumb, one set of green colored hole templates for placement and marking of locations for screws or nails when using 6 inch boards and another set of red colored hole templates for placement and marking of locations for screws or nails when using 4 inch boards.

4 Claims, 2 Drawing Sheets

DECK TOOL

CROSS REFERENCE TO RELATED APPLICATIONS

None.

BACKGROUND OF INVENTION

1. Field of the Invention

This invention is a one-piece formed tool designed for use in deck construction, incorporating a square, a hard 45 degree angle, angled edges of ⅛ inch and 3/16 inch, a hanging hole for attachment of a string for use of the tool as a plumb, one set of green colored hole templates for placement and marking of locations for screws or nails when using 6 inch boards and another set of red colored hole templates for placement and marking of locations for screws or nails when using 4 inch boards.

2. Description of Prior Art

This invention is an improvement over prior art, supplying a deck tool for the construction of a deck, having not only features and characteristics of prior art, but having improvement in the addition of template guides and holes for the proper placement of nails, screws, or other fasteners for a variety of decking boards to the frame of the deck and an edge functioning as a multiple width spacing guide. The following U.S. Patents are disclosed within and incorporated into this utility patent application.

U.S. Pat. No. 5,575,074 to Cottongim et al. discloses a speed square combining a metric and standard marking tool with a wrench in the shape of a triangle. In U.S. Pat. Nos. 5,560,117 to Tallman, 4,955,142 to Reick, and 4,850,114 to Vockins, deck board spacers are disclosed. A roofing speed square and method of use is disclosed in U.S. Pat. No. 5,170,568 to Wright, including markings for the multiple standard angle cutting of rafters. U.S. Pat. No. 4,930,225 to Phillips discloses a deck board spacer and nailing guide that is a trapezoid having a handle, nailing guides, a singular board spacing guide, and a rigid right angle and a 45 degree angle. A spring loaded, nailing and screw guide and clamping device is disclosed in U.S. Pat. No. 4,766,782 to Tanner.

SUMMARY OF THE INVENTION

The present invention is a one-piece tool to be used for the construction of decks using multiple dimensional lumber or other material, including 2×4, 2×6, 5/4×6, and 4×4 dimensions, provides a right angle square, a 45 degree angular measuring edge, nail guides for the 4 inch boards and 6 inch boards, and provides a ⅛ inch and 3/16 inch board spacer to allow water drainage and under deck evaporation and relief from condensate or humidity. A hanging hole is also provided to allow the attachment of string to use the tool as a plumb bob for determining center or to allow for measurement of vertical level in the deck construction.

DESCRIPTION OF THE DRAWINGS

The following drawings are submitted with this utility patent application.

FIG. 5 is a third side view of the invention.

FIG. 6 is a reverse angle side view of FIG. 5, and is a fourth side view of the invention.

DESCRIPTION OF THE PREFERRED EMBODIMENT

Figure 1:
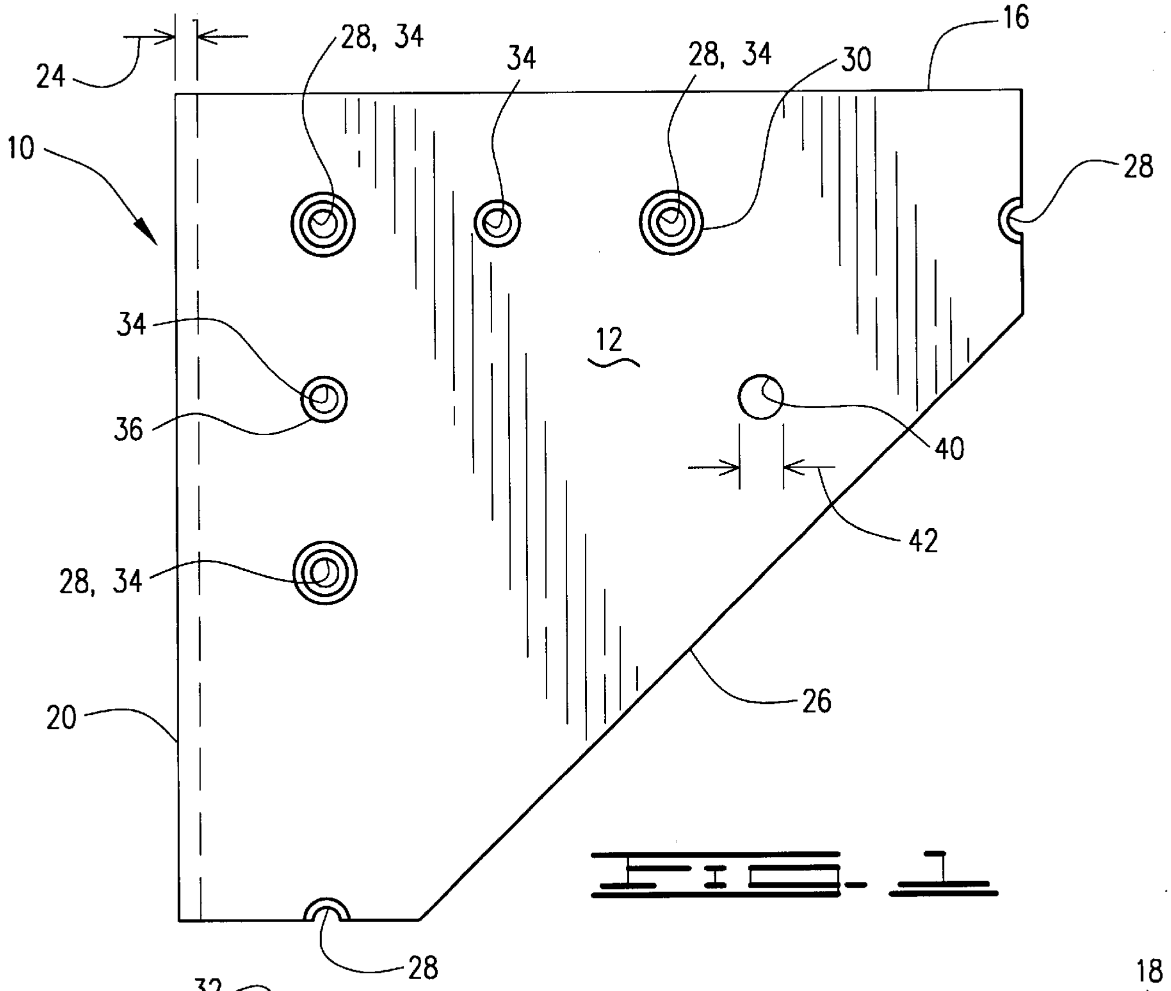
FIG. 1 is a top view of the invention.
Figure 2:
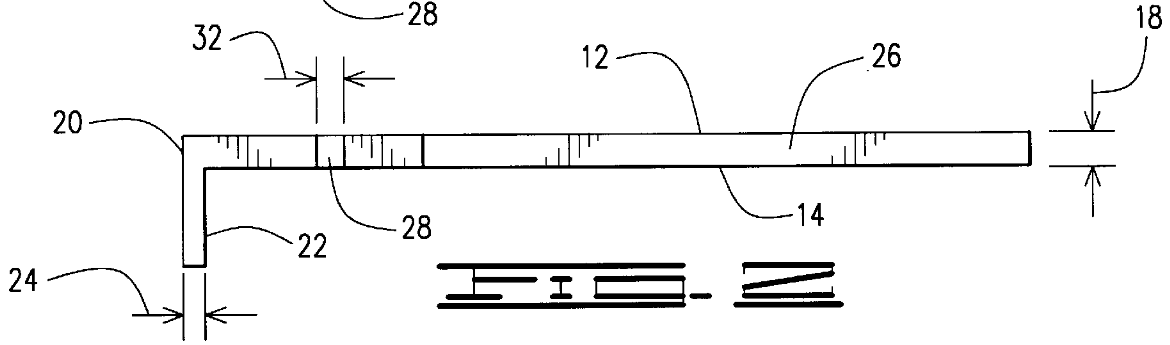
FIG. 2 is a side view of the invention.
Figure 3:
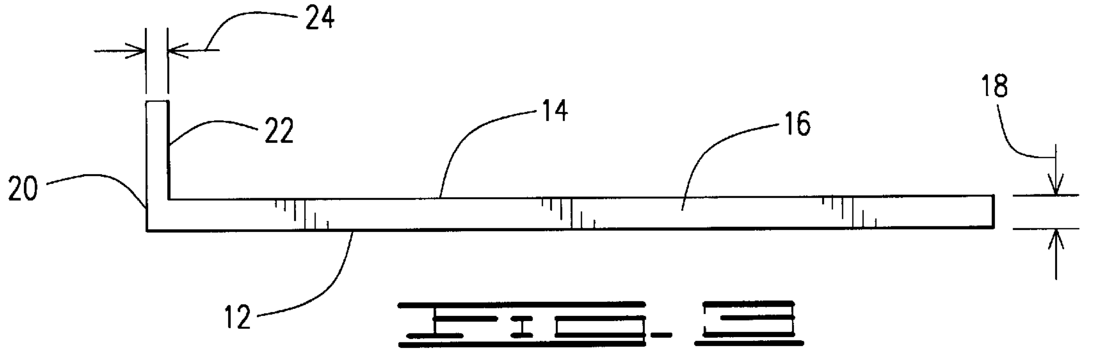
FIG. 3 is a second side view of the invention.
Figure 2:
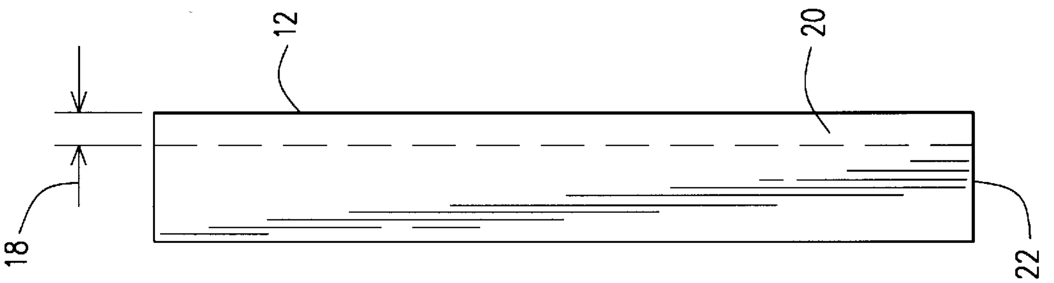
Figure 3:
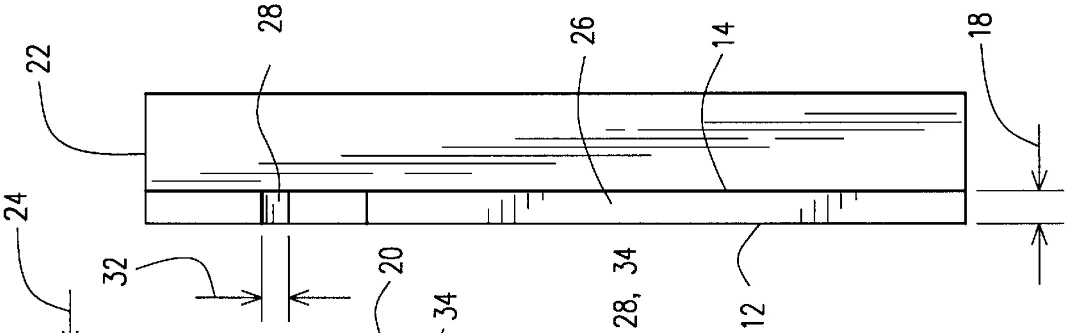
Figure 4:
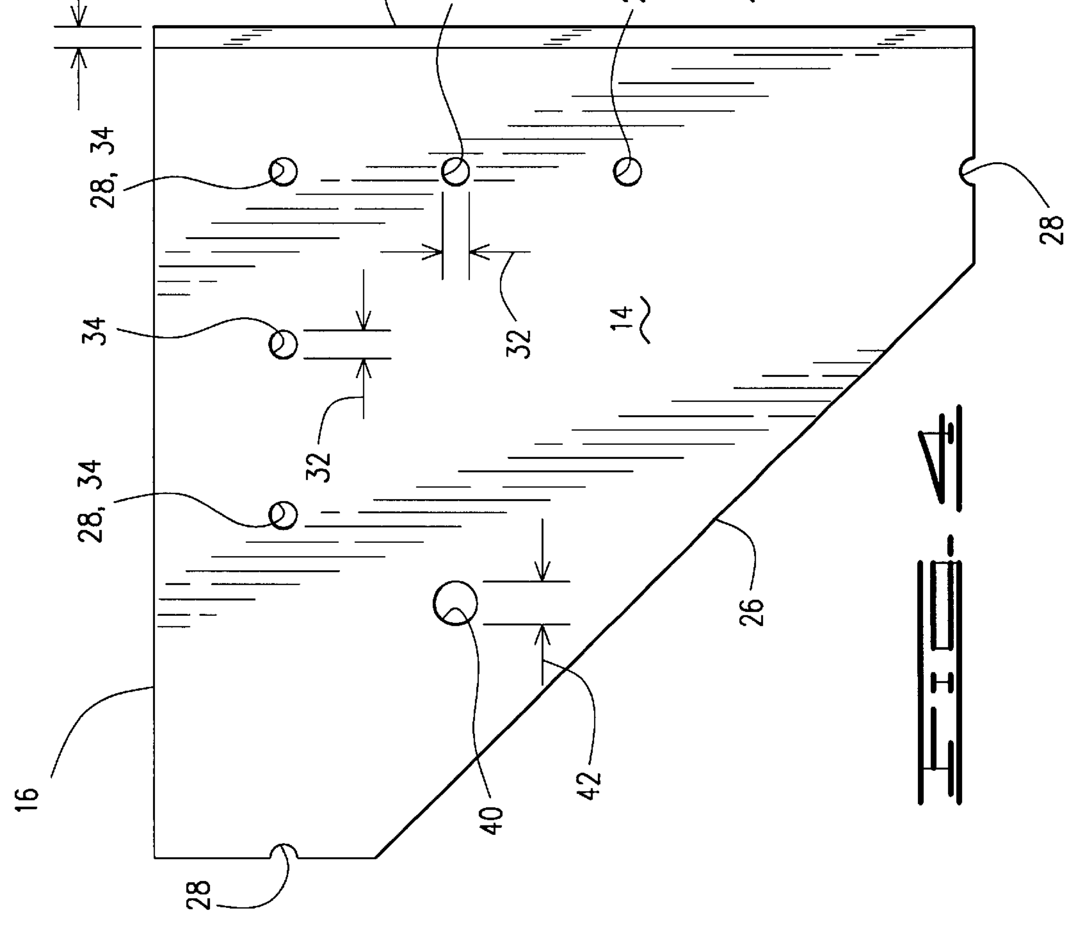
FIG. 4 is an underside view of the invention.

Referring to FIGS. 1–6 of the drawings, the invention 10 is a rigid, single-piece, right angle triangular shaped deck tool comprising a top surface 12,a bottom surface 14, a right angle first edge 16 of 3/16 inch thickness 18, a right angle second edge 20 having a descending right angle spacing guide 22 which is ⅛ inch in width 24, and a 45 degree angle third hypotenuse edge 26 of 3/16 inch thickness 18.

The top surface 12 has two first sets of three marked and spaced holes 28, having a first colored circumference 30 and being 5/32 in diameter 32, the three marked and spaced holes 28 provided from the top surface 12 through the 3/16 inch thickness 18 to the bottom surface 14, one set aligned parallel to the right angle first edge 16, and another set aligned parallel to the right angle second edge 20. These first sets of three marked and spaced holes 28 are spaced at a distance 38 from the respective edges 16, 20, to properly mark the optimum location of nails or screw in a deck board of a 6 inch width.

The top surface 12 also has two second sets of three marked and spaced holes 34, having a second and different colored circumference 36 and being 5/32 in diameter 32, the second set of three marked and spaced holes 34 provided from the top surface 12 through the 3/16 inch thickness 18 to the bottom surface 14, one set aligned parallel to the right angle first edge 16, and another set aligned parallel to the second right angle edge 20. These second sets of three marked and spaced holes 34 are spaced at a distance 38 from the respective edges 16, 20, to properly mark the optimum location of nails or screw in a deck board of a 4 inch width.

A hanging hole 40 having a ¼ inch diameter 42, is provided in a location in the top surface 12 through the 3/16 inch thickness 18 to the bottom surface 14, the hanging hole placed in a location wherein a string is attached to the hanging hole 40 and the invention may be used as a plumb bob to locate a hanging center or to check for vertical level when constructing the deck.

While a preferred embodiment of the invention has been illustrated herein, it is to be understood that changes and variations may be made by those skilled in the art without departing from the spirit and scope of the appending claims.

What is claimed is:

1. A rigid, single-piece right triangular shaped deck tool comprising:

a top surface, a bottom surface, a right angle first edge, a right angle second edge having a descending right angle spacing guide, a 45 degree angle third hypotenuse edge, two first sets of aligned holes having a first colored circumference traversing from the top surface to the bottom surface, one first set of aligned holes parallel to the right angle first edge, and the other first set of aligned holes parallel to the right angle second edge, spaced from the first and second edges at a distance from the respective edges to properly mark nail and screw locations for the attachment of a 6 inch deck board, two second sets of aligned holes having a second colored circumference traversing from the top surface to the bottom surface, one second set of aligned holes parallel to the right angle first edge, and the other second set of aligned holes parallel to the right angle second edge, spaced from the first and second edges at a distance from the respective edges to properly mark nail and screw locations for the attachment of a 4 inch deck board, a thickness of the top surface to the bottom surface, a width of the descending right angle spacing guide different from the thickness of the top surface to the bottom surface, providing at least two different spacing guides for use in the spacing of the deck boards to facilitate water or condensate movement between decking boards, a hanging hole in the top surface traversing from the top surface to the bottom surface, wherein a string may be attached to use the deck tool as a plumb bob for obtaining a vertical level in the construction of a deck.

2. The invention, as described in claim 1, further comprising, the thickness of the top surface to the bottom surface is 3⁄16 inch.

3. The invention, as described in claim 1, further comprising the width of the descending right angle is 1⁄8 inch.

4. The invention, as described in claim 1, further comprising the diameter of the first and second sets of aligned holes is 5⁄32 inch and the diameter of the hanging hole is 1⁄4 inch.

* * * * *